G. H. WOLFE.
BEARING.
APPLICATION FILED DEC. 28, 1916.
1,224,874.
Patented May 1, 1917.
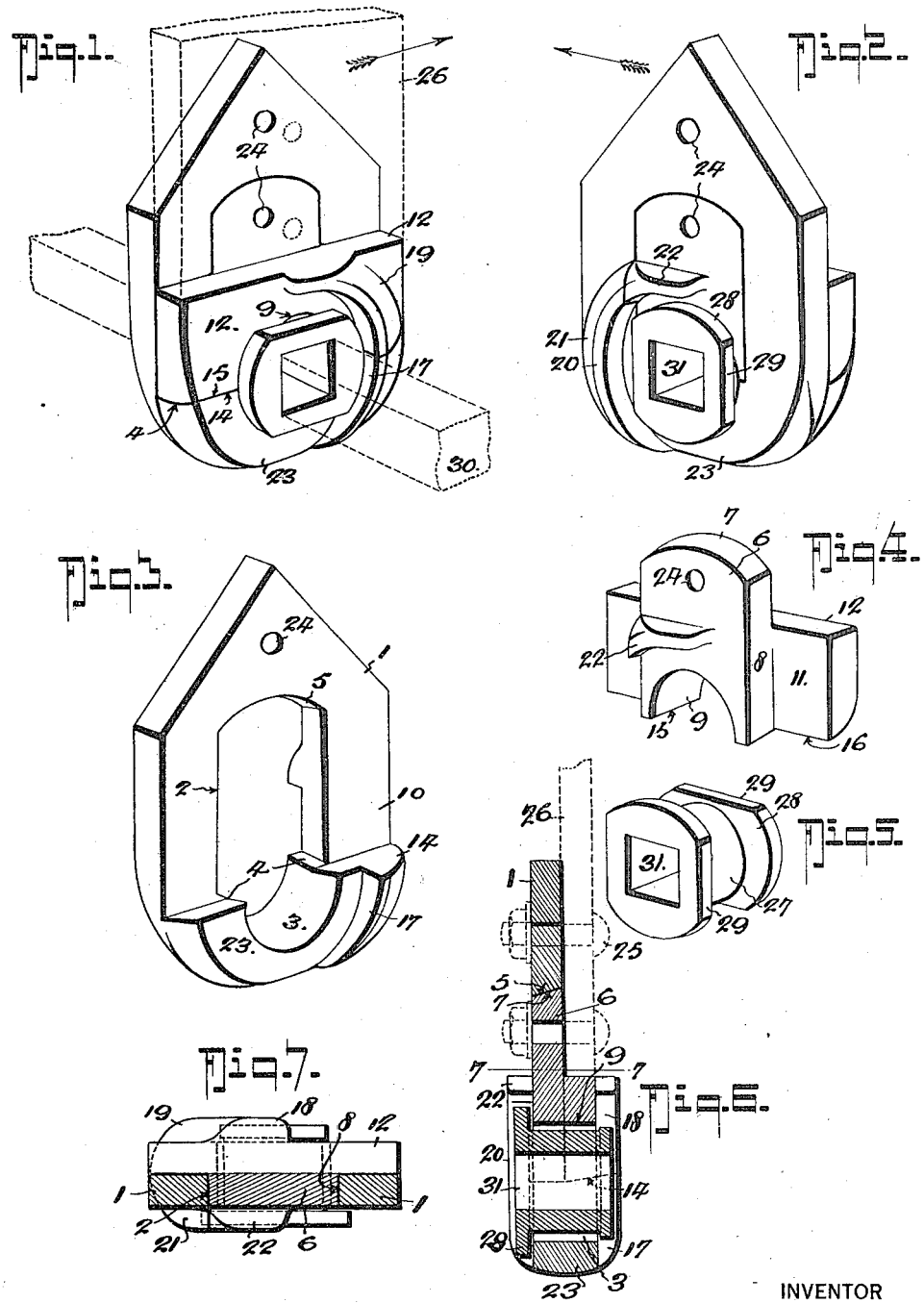
INVENTOR
G.H. Wolfe.
BY
Fred G. Dieterich
ATTORNEYS.

UNITED STATES PATENT OFFICE.

GARNETT H. WOLFE, OF CHENEY, WASHINGTON, ASSIGNOR TO ROTARY ROD WEEDER & MANUFACTURING COMPANY, INCORPORATED, OF CHENEY, WASHINGTON.

BEARING.

1,224,874.  Specification of Letters Patent.  Patented May 1, 1917.

Application filed December 28, 1916. Serial No. 139,349.

*To all whom it may concern:*

Be it known that I, GARNETT H. WOLFE, residing at Cheney, in the county of Spokane and State of Washington, have invented certain new and useful Improvements in Bearings, of which the following is a specification.

My invention relates to certain new and useful improvements in bearings for agricultural machinery in which the bearing is designed to sustain a rotary part operative beneath the surface of the ground.

The invention is especially adapted for use in connection with rotary rod weeders of the general type disclosed in Letters Patent to Grover C. Wolfe and Henry K. Wolfe, issued January 10, 1911 and re-issued April 6, 1915, under No. 13,899. In agricultural implements of this character, the bearings which sustain underground-rotating parts wear out with great frequency, owing to the fact that dirt and grit is encountered by the bearings. It has also been found that in bearings of the ordinary type such, for instance, as that disclosed in the patent above referred to, dirt and grit will frequently enter the bearing to such an extent as to clog or jam the bearing, making the rotary act a difficult one, and requiring the bearing to be cleaned out.

In my present invention, it has been an object to provide a bearing in which the wearing parts can be readily replaced when worn and in which the structure is so designed that any dirt or grit entering between the bearing surfaces will work its way out and be thrown off, as it were, thus making the bearing a self-cleaning one. It has been another object of the invention to provide a bearing with guard provisions to relieve the rotative element of the bearing from pressures by engaging the dirt in the direction of movement of the bearing through the ground, thus reducing to the minimum the friction on the bearing surfaces and eliminating, in large degree, the pressures which tend to force dirt and grit into the bearing surfaces.

In its generic nature, the invention comprises a relatively stationary bearing body made in matching sections to facilitate replacement of a rotative element, which is in the general form of a spool and is rotatively located in a bearing bore in the relatively stationary body, the spool having a passage through the same in which the rotating weeder rod is designed to be located, the spool having flanges to retain it against endwise movement while the relatively stationary body is provided on its forward side with pressure relieving dirt deflecting guard projections or flanges that overlie the flanges of the spool.

In its more detailed nature, the invention comprises those novel features of construction, combination and arrangement of parts, all of which will be first fully described, then be specifically pointed out in the appended claims, and illustrated in the accompanying drawing, in which:—

Figure 1 is a perspective view of one of the improved bearings, the supporting standard of the machine being indicated in dotted lines, as is also the rotatable weeder rod.

Fig. 2 is a perspective view of the bearing looking from the side opposite to that in Fig. 1.

Fig. 3 is a perspective view of the main section of the relatively stationary bearing element, *per se*, looking at the same in the same direction as in Fig. 1.

Fig. 4 is a perspective view of the supplemental or removable section of the relatively stationary bearing element looking at the same in the same direction as in Fig. 2.

Fig. 5 is a perspective view of the spool which rotates in the bearing bore of the relatively stationary bearing element and which is hereinafter also termed the rotative bearing element.

Fig. 6 is a central vertical longitudinal section of the parts shown in Fig. 1.

Fig. 7 is a horizontal section on the line 7—7 of Fig. 6.

Referring now to the accompanying drawing, in which like numerals of reference designate like parts in all of the figures, the relatively stationary or non-rotative element of the bearing consists of a flat body 1 having plane sides 10 extending down to about in alinement with the axis of the bearing bore, which bearing bore is formed one half 3 on the lower end of the body 1, and the other half 9 on the removable section 6 of the relatively stationary element.

The body 1 is provided with an opening having parallel side walls 2 and a beveled top wall 5, the width of the opening being greater than the diameter of the bearing bore to leave shoulders 4. The bearing end of the member 1 is of greater thickness than the thickness of the upper part of the member 1 so as to provide shoulders 14 which merge with the shoulders 4 and mate with corresponding shoulders 15 on the lower or bearing end of the removable body 6. The removable body 6, above the lateral projections 12, is of the same thickness as the upper part of the body 1 and the upper part of the body 6 is beveled at 7 to match with the bevel 5 of the body 1 when the parts are assembled. The body 6 is thickened as at 12 and has lateral projections 11 which lie against the body 1 and have their lower surfaces 16 to match with the surfaces 14, while the lower ends 15 of the body 6 match with the shoulder surfaces 4. When the parts shown in Figs. 3 and 4 are assembled there will be provided a bearing bore 3—9 to receive the cylindrical portion 27 of the rod carrying spool, the flanges 28 of which lie against the side faces of the stationary member 1—6, as clearly shown in Figs. 1 and 2 of the drawing.

In order that the bearing may be self-cleaning, the bore 3—9 is of somewhat greater diameter than the diameter of the cylindrical portion 27 of the spool and the flanges 28 are cut away, as at 29, to leave a portion of the bearing opening 3—9 exposed to allow the dirt to work out at the exposed portion and be thrown away by the flat faces 29 of the flanges 28 when under rotation.

The parts shown in Figs. 3 and 4 are held together against displacement and in a rigid manner by bolts 25 which pass through apertures 24 and bolt the body 1 to the frame bar 26 on the lower end of which the bearing is secured, it being understood that the bar 26, in practice, rests with its lower edge on the upper face of the body 12 and against the adjacent face of the bodies 1 and 6, as indicated in dotted lines in Fig. 1, it being understood that the rotary rod 30 passes through the square bore 31 of the spool, (see dotted lines, Fig. 1).

In order to guard against dirt entering the bearing under pressure during the forward movement of the bearing, I provide arcuate ribs or projections 17—19 on one side of the bearing, and 20—22 on the other side of the bearing formed partly integral with the lower end 23 of the body 1, and partly with the lower end of the body 6 and its thickened portion 12, as clearly illustrated in Figs. 1 and 2 of the drawing, the forward faces of these ribs being curved or beveled, as at 19 and 21, to facilitate passage through the guard with a dirt separating or parting action, thus tending to keep the dirt away from the rotative element, (the spool) shown in Fig. 5.

In practice, one or the other of the bearing elements, either the relative stationary element, or the rotative element, (preferably the latter) may be formed of a somewhat softer material so that the principal wear will occur on one part. When the spool is made the softer element, the cost for replacement is reduced to the minimum and in order to replace a worn spool it is only necessary to remove the bolts 25 when the bearing can be slipped to one side, the section 6 removed from the section 1 and the spool taken out of the bearing, slipped off the rod 30 and a new spool substituted therefor, whereupon the parts can be quickly assembled and then again secured to the supporting frame bar 26.

From the foregoing description, taken in connection with the accompanying drawing, it is thought the complete construction, operation and advantages of my invention will be readily understood by those skilled in the art.

What I claim is:—

1. A bearing of the character stated comprising a relatively fixed element and a rotative element, said fixed element consisting of separable bearing sections, means for supporting said fixed element and holding said separable sections in place, said rotative element including a spool having rotation in a bearing bore in said relatively stationary element, said spool having portions of its flanges removed to expose the bearing bore of the stationary element for self-cleaning purposes, said spool having a passage adapted to receive a rotating rod.

2. A bearing of the character stated comprising a relatively fixed element and a rotative element, said fixed element consisting of separable bearing sections, means for supporting said fixed element and holding said separable sections in place, said rotative element including a spool having rotation in a bearing bore in said relatively stationary element, said spool having portions of its flanges removed to expose the bearing bore of the stationary element for self-cleaning purposes, said spool having a passage adapted to receive a rotating rod, said relatively fixed element having laterally projecting guard ribs or flanges overlying the flanges of the spool.

3. A bearing of the character stated comprising a relatively fixed element and a rotative element, said fixed element consisting of separable bearing sections, means for supporting said fixed element and holding said separable sections in place, said rotative element including a spool having rotation in a bearing bore in said relatively stationary element, said spool having portions of its flanges removed to expose the bearing bore of the stationary element for self-cleaning purposes, said spool having a passage adapted to receive a rotating rod, said relatively fixed element having laterally projecting guard ribs or flanges overlying the flanges of the spool at the front or dirt penetrating edge of the bearing.

4. A bearing for rotary rod weeders and the like comprising a relatively fixed element and a rotative element, said fixed element consisting of a main body having an elongated passage through the same, the lower end of said passage merging with a half-bearing bore, said body being of greater thickness at its lower end than at its upper extremity, said relatively stationary bearing element including a second body having a portion to fit into said elongated slot and provided with a half-bearing bore to match with the half-bearing bore of said main body and having lateral and longitudinal projections to lie against said main body, said main and said supplemental bodies having bolt apertures, a pendent support to which said relatively stationary element is adapted to be bolted through said apertures to hold the two parts of the stationary bearing element in operative relation, said rotative element comprising a spool having flanges connected by a cylindrical body designed to rotate in said bearing bore of said stationary element, the flanges of said spool tending to partly hold the parts of said stationary element in matching relation adjacent to the bearing apertures.

5. A bearing for rotary rod weeders and the like comprising a relatively fixed element and a rotative element, said fixed element consisting of a main body having an elongated passage through the same, the lower end of said passage merging with a half-bearing bore, said body being of greater thickness at its lower end than at its upper extremity, said relatively stationary bearing element including a second body having a portion to fit into said elongated slot and provided with a half-bearing bore to match with the half-bearing bore of said main body and having lateral and longitudinal projections to lie against said main body, said main and said supplemental bodies having bolt apertures, a pendent support to which said relatively stationary element is adapted to be bolted through said apertures to hold the two parts of the stationary bearing element in operative relation, said rotative element comprising a spool having flanges connected by a cylindrical body designed to rotate in said bearing bore of said stationary element, the flanges of said spool tending to partly hold the parts of said spool element in matching relation adjacent to the bearing apertures, each of said relatively stationary bearing sections having complementary guard ribs overlying the spool flanges.

6. A bearing of the character stated comprising in combination with a relatively stationary supporting bar and a relatively rotating rod, of a bearing consisting of a relatively stationary element and a rotative element, the stationary element having a bearing bore to receive the rotative element, said stationary element comprising separable sections, said rotative element having provision for retaining said sections in correlative position adjacent to the bearing apertures and means for securing said relatively stationary element to the supporting bar.

7. A bearing of the character stated comprising in combination with a relatively stationary supporting bar and a relatively rotating rod, of a bearing consisting of a relatively stationary element and a rotative element, the stationary element having a bearing bore to receive the rotative element, said stationary element comprising separable sections, said rotative element having provision for retaining said sections in correlative position adjacent to the bearing apertures, means for securing said relatively stationary element to the supporting bar, said relatively stationary element having means for guarding said rotative element and the bearing surfaces against entry of dirt under pressure during the travel of the machine.

8. A bearing for rotary rod weeders comprising a relatively stationary element and a rotative element, the stationary element having a bearing bore to receive the rotative element, said stationary element comprising separable sections, said rotative element having provision for retaining said sections in correlative position adjacent to the bearing bore, and said bearing having provision for clearing the bearing surfaces of dirt that may enter the same.

9. A bearing for rotary rod weeders comprising a relatively stationary element and a rotative element, the stationary element having a bearing bore to receive the rotative element, said stationary element comprising separable sections, said rotative element having provision for retaining said sections in correlative position adjacent to the bearing bore, said bearing including means for relieving the bearing surfaces of dirt that may enter the same, said means comprising flanges on the rotative element which only partially cover the bearing apertures, thus leaving portions of the bearing apertures exposed.

10. A bearing for rotary rod weeders comprising a relatively stationary element and a rotative element, the stationary element having a bearing bore to receive the rotative element, said stationary element comprising separable sections, said rotative element having provisions for retaining said sections in correlative position adjacent to the bearing bore, said bearing having provision for relieving the bearing surfaces of dirt that may enter the same, said separable sections including matching body parts adapted to be bolted to a pendent support.

11. A bearing for rotary rod weeders comprising a relatively stationary element and a rotative element, the stationary element having a bearing bore to receive the rotative element, said stationary element comprising separable sections, said rotative element having provisions for retaining said sections in correlative position adjacent to the bearing bore, flanges on the rotative element which only partially cover the bearing apertures, thus leaving portions of the bearing apertures exposed, whereby the bearing surfaces may be cleared of dirt that may enter the same, said separable sections including matching body parts adapted to be bolted to a pendent support.

GARNETT H. WOLFE.

Copies of this patent may be obtained for five cents each, by addressing the "Commissioner of Patents, Washington, D. C."